(12) United States Patent
Abrams et al.

(10) Patent No.: US 8,768,967 B2
(45) Date of Patent: Jul. 1, 2014

(54) DATA EXPORT/IMPORT FROM MULTIPLE DATA SOURCES TO A DESTINATION DATA REPOSITORY USING CORRESPONDING DATA EXPORTERS AND AN IMPORTER

(71) Applicant: McKesson Health Solutions LLC, San Francisco, CA (US)

(72) Inventors: Peter M. Abrams, Portland, OR (US); Vik S. Anantha, Portland, OR (US)

(73) Assignee: McKesson Technologies Inc., San Francisco, CA (US)

( * ) Notice: Subject to any disclaimer, the term of this patent is extended or adjusted under 35 U.S.C. 154(b) by 0 days.

(21) Appl. No.: 13/779,641

(22) Filed: Feb. 27, 2013

(65) Prior Publication Data

US 2013/0173668 A1   Jul. 4, 2013

Related U.S. Application Data

(63) Continuation of application No. 12/876,806, filed on Sep. 7, 2010, now Pat. No. 8,402,062, which is a continuation of application No. 11/739,512, filed on Apr. 24, 2007, now Pat. No. 7,792,793.

(51) Int. Cl.
*G06F 17/30* (2006.01)

(52) U.S. Cl.
CPC ..................... *G06F 17/30* (2013.01)
USPC ........... 707/791; 707/736; 707/758; 707/781; 707/802; 707/822

(58) Field of Classification Search
CPC ....................................................... G06F 17/30
USPC .................................................. 707/600–899
See application file for complete search history.

(56) References Cited

U.S. PATENT DOCUMENTS

| | | | |
|---|---|---|---|
| 5,628,530 A | 5/1997 | Thornton |
| 6,012,035 A | 1/2000 | Freeman et al. |
| 6,757,898 B1 | 6/2004 | Ilsen et al. |
| 6,769,228 B1 | 8/2004 | Mahar |
| 7,155,397 B2 | 12/2006 | Alexander et al. |
| 7,792,793 B2 | 9/2010 | Abrams et al. |
| 8,402,062 B2 | 3/2013 | Abrams et al. |

(Continued)

FOREIGN PATENT DOCUMENTS

| | | |
|---|---|---|
| CA | 2482370 | 3/2006 |
| WO | 9503569 | 2/1995 |
| WO | 0039737 | 7/2000 |
| WO | 2007025295 | 3/2007 |

OTHER PUBLICATIONS

Non-Final Office Action for U.S. Appl. No. 11/739,512 mailed May 29, 2009.

(Continued)

*Primary Examiner* — Isaac M Woo
(74) *Attorney, Agent, or Firm* — Sutherland Asbill & Brennan LLP

(57) ABSTRACT

Embodiments of the present invention provide methods and systems for exporting data from a number of data sources using a number of corresponding data exporters, and importing the exported data into a destination data repository using a data importer. In various embodiments, the data exporters may be automatically generated using a data exporter generator adapted to generate the data exporters in view of data schemas of the data sources.

16 Claims, 5 Drawing Sheets

(56) References Cited

U.S. PATENT DOCUMENTS

| | | |
|---|---|---|
| 2001/0047372 A1 | 11/2001 | Gorelik et al. |
| 2002/0002495 A1 | 1/2002 | Ullman |
| 2002/0087583 A1 | 7/2002 | Morgan et al. |
| 2002/0111832 A1 | 8/2002 | Judge |
| 2002/0198831 A1 | 12/2002 | Patricelli et al. |
| 2003/0009367 A1 | 1/2003 | Morrison |
| 2003/0050799 A1 | 3/2003 | Jay et al. |
| 2003/0093770 A1 | 5/2003 | Fernandez |
| 2003/0149625 A1 | 8/2003 | Leonardi et al. |
| 2003/0154163 A1 | 8/2003 | Phillips et al. |
| 2003/0229540 A1 | 12/2003 | Algiene |
| 2004/0039599 A1 | 2/2004 | Fralic |
| 2004/0073457 A1 | 4/2004 | Kalies |
| 2004/0078234 A1 | 4/2004 | Tallal, Jr. |
| 2004/0117323 A1 | 6/2004 | Mindala |
| 2004/0148198 A1 | 7/2004 | Kalies |
| 2004/0249745 A1 | 12/2004 | Baaren |
| 2005/0015280 A1 | 1/2005 | Gabel et al. |
| 2005/0015360 A1 | 1/2005 | Cras et al. |
| 2005/0060201 A1 | 3/2005 | Connely, III et al. |
| 2005/0102169 A1 | 5/2005 | Wilson |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240473 A1 | 10/2005 | Ayers, Jr. et al. |
| 2005/0288972 A1 | 12/2005 | Marvin et al. |
| 2006/0020514 A1 | 1/2006 | Yered |
| 2006/0026041 A1 | 2/2006 | Ullman |
| 2006/0085393 A1 | 4/2006 | Modesitt |
| 2006/0149784 A1 | 7/2006 | Tholl et al. |
| 2006/0184391 A1 | 8/2006 | Barre et al. |
| 2006/0259363 A1 | 11/2006 | Jhetam |
| 2007/0005402 A1 | 1/2007 | Kennedy et al. |
| 2007/0050209 A1 | 3/2007 | Yered |
| 2007/0136100 A1 | 6/2007 | Daugherty et al. |
| 2007/0226678 A1 * | 9/2007 | Li et al. .................. 717/101 |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2007/0294389 A1 | 12/2007 | Bauer et al. |
| 2011/0113074 A1 | 5/2011 | Abrams et al. |

OTHER PUBLICATIONS

Final Office Action for U.S. Appl. No. 11/739,512 mailed Oct. 28, 2009.

Non-Final Office Action for U.S. Appl. No. 11/739,512 mailed Feb. 5, 2010.

Notice of Allowance for U.S. Appl. No. 11/739,512 mailed May 14, 2010.

Final Office Action for U.S. Appl. No. 12/876,806 mailed Aug. 20, 2012.

Notice of Allowance for U.S. Appl. No. 12/876,806 mailed Dec. 3, 2012.

Sampson, R.J., Taking Control of Health Care Costs, Best's Review—Life Health Insurance Edition, Nov. 1983, vol. 84, Issue 7, USA; Abstract only.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic; On-line Goes In-House, Chain Store Age Executive, Jan. 1987, vol. 63, Issue 1, USA; Abstract only.

Anonymous, TechRx Announces Successful Beta Deployment of T-Rex. PR Newswire. May 13, 2002.

* cited by examiner

DATA EXPORT/IMPORT FROM MULTIPLE DATA SOURCES TO A DESTINATION DATA REPOSITORY USING CORRESPONDING DATA EXPORTERS AND AN IMPORTER

CROSS-REFERENCE TO RELATED APPLICATIONS

This application is a continuation of U.S. application Ser. No. 12/876,806, filed Sep. 7, 2010, which is a continuation of U.S. application Ser. No. 11/739,512, filed Apr. 24, 2007, now U.S. Pat. No. 7,792,793, issued Sep. 7, 2010.

TECHNICAL FIELD

Embodiments of the present invention relate to the field of data processing, and, in particular, to methods and apparatuses for exporting data from a number of data sources into a destination data repository.

BACKGROUND

With advances in integrated circuit, microprocessor, networking, and communication technologies, an increasing number of devices, in particular, digital computing devices, are being interconnected to solve government and business problems to increase efficiency and reduce cost. However, the application of advanced information technology (IT) is often blocked or made difficult by the existence of legacy data, maintained in various incompatible data sources and data formats. Migration and consolidation of the data into a common repository with common data format often become an essential pre-requisite. But, in many governmental and business problems, the volume of data, data sources and data format are so overwhelming, it is virtually impossible to address the problem manually or in a piecewise effort.

Improving the efficiency and possibly reducing the cost for the provision of medical services is a good example. The problem has been substantially under attended to for so long, there are massive volumes of physician, patient and other medical service related demographic data residing in a plethora of heterogeneous databases of incompatible data formats. Consolidating these demographic data into a common demographic data repository with common data formats is for all practical purposes essential for any provider and medical services related organization to attempt to apply advanced information technology (IT) to improve the efficiency and possibly reduce the cost for the provision of medical services.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description is presented, in part, in terms of operations performed by a processor-based device, using terms such as exporting, funneling, reading, validating, transforming, importing and the like, consistent with the manner employed by those skilled in the art. Quantities may take the form of electrical, magnetic, or optical signals capable of being stored, transferred, combined and/or otherwise manipulated through mechanical, electrical, and/or optical components of a processor-based device. Thus, none of these operational terms in the specification, including the claims, are to be construed as manual operations.

The various operations may be described as multiple discrete steps in turn, in a manner that may be helpful in understanding embodiments of the present invention; however, the order of description should not be construed to imply that these operations are order dependent.

The description may use various combinatorial phrases NB, A and/or B, etc. If used, for the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)" that is, A is an optional element.

The description may also use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
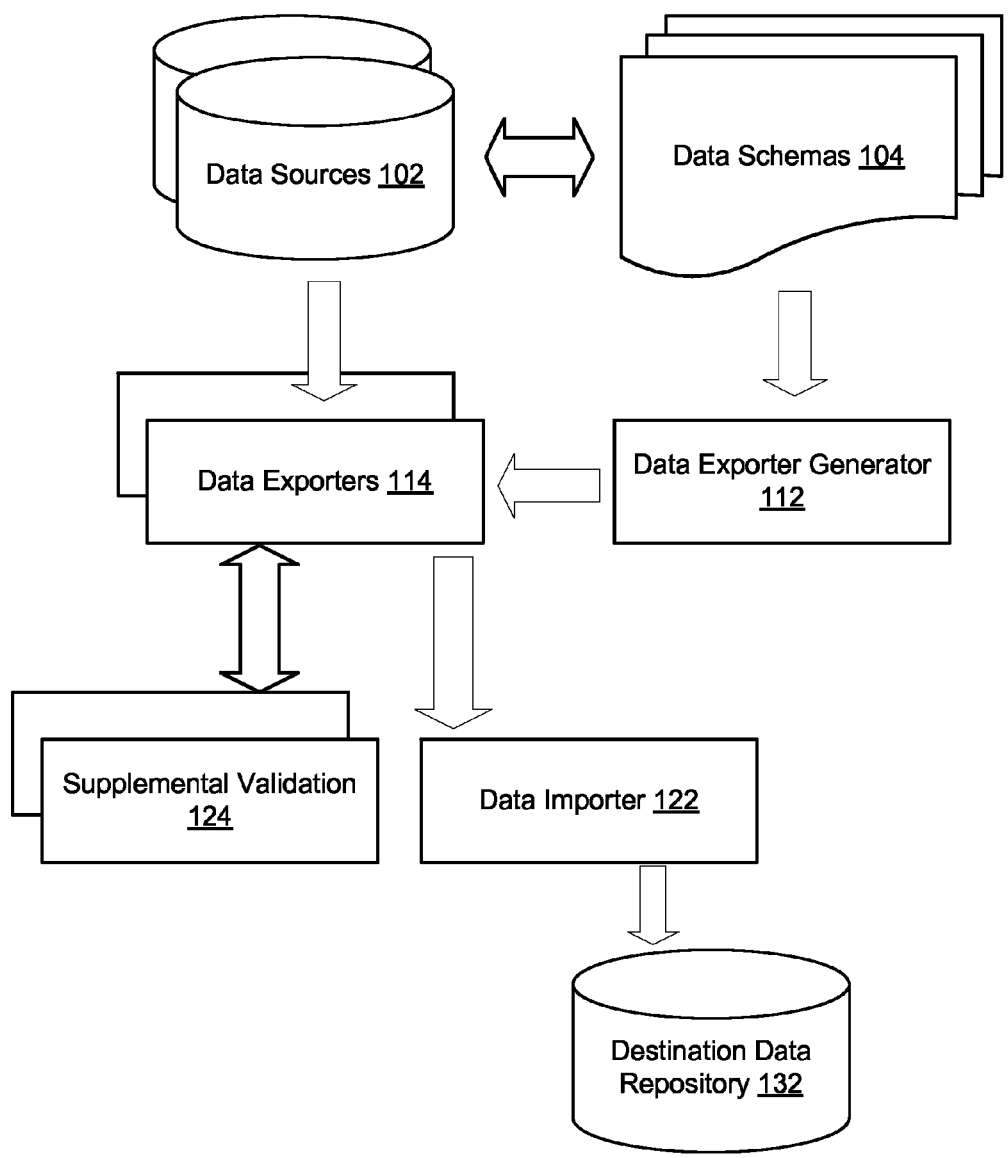
FIG. 1 illustrates an overview of the data exporter/importer system of the present invention, in accordance with various embodiments.

FIG. 1 is a diagram illustrating an overview of the present invention in accordance with various embodiments. As illustrated, the embodiments include data exporter generator 112 and data importer 122 adapted to cooperate with each other to facilitate exporting of data from data sources 102 and importing the exported data into destination data repository 132. Data exporter generator 112 and data importer 122 are adapted to allow data sources 102 to be heterogeneous. Data sources 102 may be databases or extracted files of databases. Further, data sources 102 may provide similar or different data in similar or different data formats. However, data stored in destination data repository 132 may have a unified data format; further the data may be organized or modeled.

Data schemas 104 are employed to describe the data of data sources 102 and typically include their formats. Data schemas 104 may also be employed to describe the data exporter generator 112 and the validation to be performed on data exported out of data sources 102. Typically, one data schema 104 is employed per different data source 102.

Data stored in destination data repository 132 may be organized or modeled. The organization or model is made known to data importer 122, allowing data importer 122 to be able to perform organizational and model processing on the data being imported, to enable the data to be stored in the destination data repository 132 in the desired organized/modeled manner.

Data exporter generator 112 is employed to automatically generate corresponding data exporters 114 for data sources 102 to export data out of the data sources 102. Data export generator 112 generates data exporters 114 in view of the data description information provided by data schemas 104. Data exporter generator 112 further generates each data exporter 114 to use data importer 122 to import its exported data into destination data repository 132, allowing data exporters 114 to leverage the knowledge data importer 122 has about destination data repository 132 and thus alleviate data exporters 114 from having to have such knowledge, to effectuate to desired export/import.

As will be described in more detail below, for the embodiments, each data exporter 114 is endowed with the ability to validate data exported out of data sources 102 as prescribed by data schemas 104. In various embodiments, data schemas 104 may also be employed to instruct data exporter generator 112 to invoke supplemental validation routines 124 to perform supplemental validations on the data being exported out of data sources 102. Typically the validations to be performed by supplemental validation routines 124 may be more complex validations. Thus, it is relatively more efficient to perform the more complex validations through supplemental processing than to describe them to data exporter generator 112 via data schemas 104 to enable data exporter generator 112 to generate the validations in-line.

In various embodiments, data exporter generator 112 may also be endowed with the data formats of destination data repository 132 to enable data exporter generator 112 to provide in-line transformation of the data exported from data sources 102 to prepare them for import into destination data repository 132.

Resultantly, embodiments of the invention enable efficient export of data from a plethora of heterogeneous data sources, and import the exported data into a destination data repository having its own data format, organization and/or model.

Figure 2:
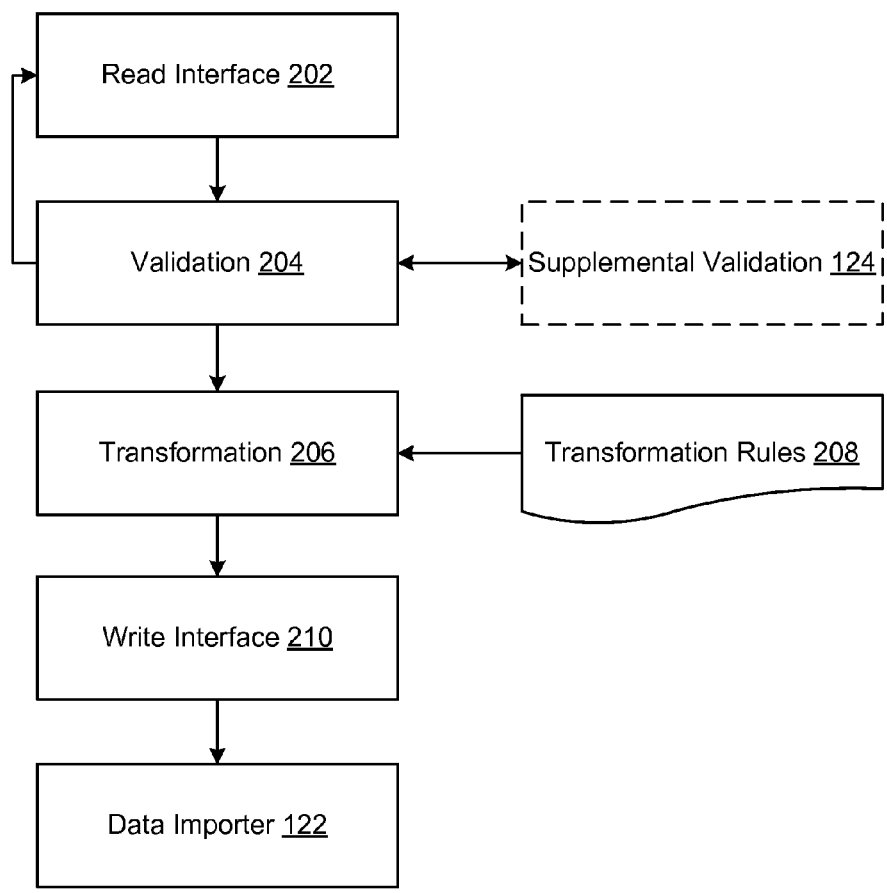
FIG. 2 illustrates a data exporter of FIG. 1 in further details, in accordance with various embodiments.

FIG. 2 illustrates selected function blocks of a data exporter generated by a data exporter generator, in accordance with various embodiments. As illustrated, data exporter 114 includes read interface 202, validation block 204, transformation block 206, transformation rules 208, and write interface 210, operationally coupled to each other and other external functions as shown. Read interface 202 is configured to read data out of a corresponding data source 102. Validation block 204 is configured to selectively validate data read out of the corresponding data source 102, inline or by invoking supplemental validation processing 112. Transformation block 206 is configured to transform the data exported from the corresponding data source 102, e.g., from one data format to another, in particular to a data format of destination data repository 132. For the embodiments, the transformation may be performed in accordance with the provided transformation rules 208. Typically, the transformations are performed after validations if validations are required. Write interface 210 is configured to write the (validated and/or transformed) data into destination data repository 132 via data importer 122, leveraging on data importer 122's knowledge of destination data repository 132, allowing the data to be stored in an organized/modeled manner.

Figure 3:
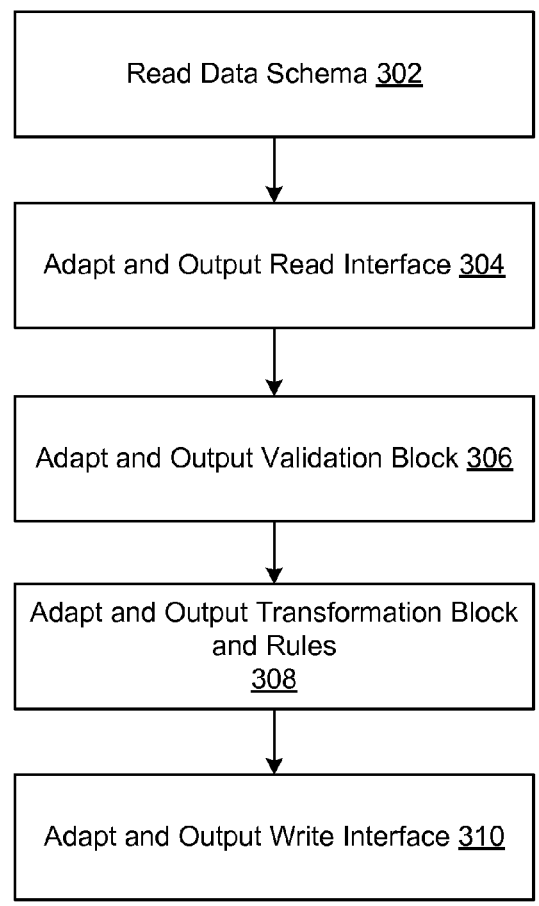
FIG. 3 illustrates selected operations of the data exporter generator, in accordance with various embodiments of the present invention.

FIG. 3 illustrates selected operations of the data exporter generator, in accordance with various embodiments. As illustrated, for the embodiments, on invocation or provided with a data schema 104 of a data source 102, data exporter generator 112 reads the data schema 104 to obtain a description of the data, including, for example, the valid data values for various data, and/or validation routines to be invoked to validate various types of data, block 302.

Thereafter, based at least in part on the description obtained, the data exporter generator 112 configures and outputs a read interface 202 for the data exporter 114 being generated, block 304. The read interface 202 is configured to read one or more data fields, records and/or files from the corresponding data source 102.

Next, based also at least in part on the description obtained, the data exporter generator 112 configures and outputs a validation block 204 for the data exporter 114 being generated, block 306. The validation block 204 is configured to selectively validate the data exported from the corresponding data source 102, either in-line, or invoking one or more supplemental validation routines 124 to be provided to complement the data exporter 114.

Similarly, based also at least in part on the description obtained, the data exporter generator 112 configures and outputs a transformation block 206 and transformation rules 208 for the data exporter 114 being generated, block 308. The transformation block 206 is configured to selectively transform the data exported from the corresponding data source 102 in accordance with transformation rules 208.

Finally, based also at least in part on the description obtained, the data exporter generator 112 configures and outputs a write interface 210 for the data exporter 114 being generated, block 310. The write interface 210 is configured to write the exported (and processed) data into destination data repository 132 using data importer 122.

Accordingly, data exporters 114 for a plethora of data sources 102 (which may be heterogeneous) may be automatically generated, in view of the data schemas 104 of the data sources 102. Further, data exporters 114 may all leverage knowledge of destination data repository 132 imparted on data importer 122. Thus, exports and imports of a large amount of data from a large number of heterogeneous data sources into a common destination data repository may be more efficiently performed.

Figure 4:
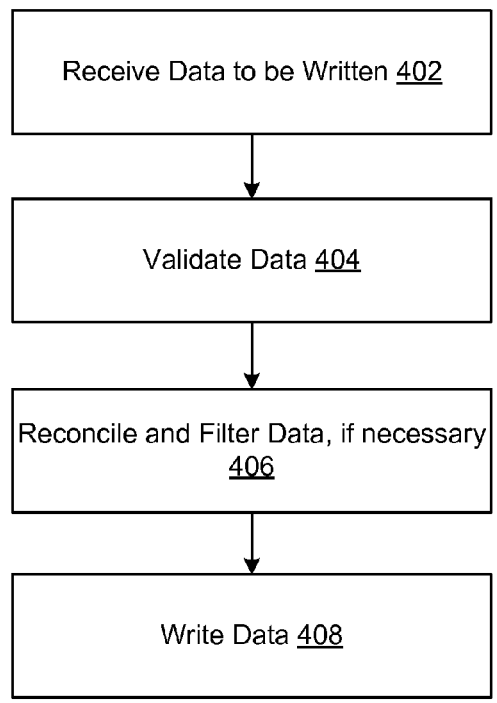
FIG. 4 illustrates selected operations of the data importer, in accordance with various embodiments of the present invention.

FIG. 4 illustrates selected operations of the data importer in accordance with various embodiments. As illustrated, for the embodiments, on invocation or receipt of data to be written into destination data repository 132, block 402, data importer 122 may optionally validate the data again, block 404, before allowing the data to be written into destination data repository 132. Thereafter, for the embodiments, data importer 122 may reconcile and/or filter the data, block 406, before writing the data into destination data repository 132, if the data is to be written into destination data repository 132. In various embodiments, data importer 122 may be endowed with the logic to discard redundant data, or data deemed to be inconsistent with other data. For example, in a medical service provider demographic application, data importer 122 may be endowed to discard duplicate service addresses, but may allow multiple unique addresses of different service locations.

Finally, if the received data is to be written into destination data repository 132, data importer 122 writes the data into destination data repository 132, block 408.

Figure 5:
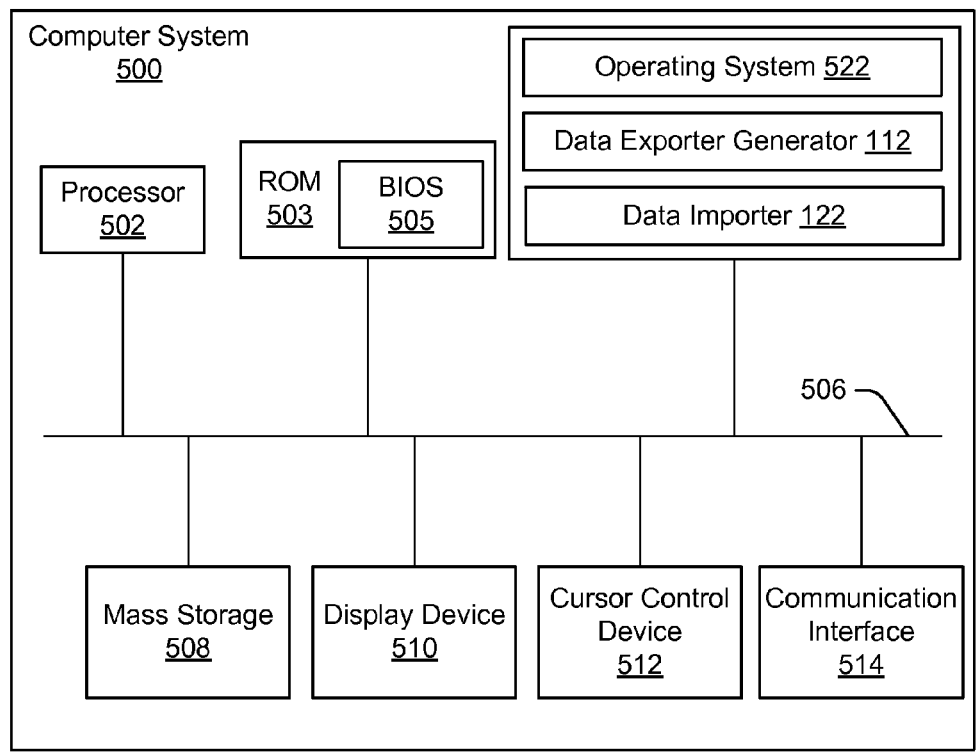
FIG. 5 illustrates an exemplary computer system suitable for use to practice the present invention, in accordance with various embodiments of the present invention.

FIG. 5 illustrates an exemplary computer system in accordance with embodiments of the present invention. As shown, example computer system 500 includes one or more processors or processor cores 502, ROM 503 including basic input/output system (BIOS) 505, and system memory 504 coupled to each other via "bus" 506. Also coupled to "bus" 506 are nonvolatile mass storage 508, display device 510, cursor control device 512, and communication interface 514. During operation, memory 504 may also include working copies of operating system 522, data exporter generator 112 and data importer 122. Data exporter generator 112 and data importer 122 may be endowed to perform the various operations as described earlier. In various embodiments, memory 504 may also include one or more applications (not shown), with which data exporter generator 112, and data importer 122 are coupled.

Example Application to Medical Service Provider Demographic Data Export and Import In various embodiments, the data sources are heterogeneous medical service provider demographic data sources of one or more medical service providers, with the medical service provider demographic data stored in the medical service provider demographic data sources in a variety of different formats. Moreover, the data may be partially redundant, and the destination data repository is a common medical service provider data model as seen by health plans and providers as well as payers, and so forth.

The model may provide for providers having several addresses designated for different purposes. For example, Place of Service/Location of Care and Contracting Address are frequently different addresses. These different addresses are frequently tracked by different departments in different databases. The model may also allow for payers to divide up their network into several regions based on Place of Service/Location of Care. Providers in different regions are managed by different databases in different databases. Further, the model may provide for provider groups with a strict hierarchical relationship, a peer to peer relationship or a combination of the two which exist in most payer networks. These relationships can be either organizational or contractual in nature.

In various embodiments, the medical service provider demographic data sources are extracted files consisting of lines of delimited fields. Each line represents one provider. The delimiter is set by a property, but is nominally the pipe ("|") character. Some fields allow multiple values (e.g., the provider may have multiple alternate names), in which case the tilde ("~") is used as a second-level delimiter. If a third-level delimiter is necessary, then it is the carrot ("^").

Further, the provider records contain two types of data:
 single-value fields
 variable-length lists of field sets For example, the provider name may be a single-value field. However, the provider's address may be composed of multiple files (line 1, line 2, city, state, zip, and so forth). Further, a provider may have multiple addresses. Hence, the list of addresses may be a variable-length list of a set of fields. Further, for single-valued fields, each field is assigned a position. Position 1 begins with the first character in a column.

In various embodiments, the data schemas may be in the form of a spreadsheet containing three worksheets:
 a first worksheet that specifies versioning information of the data schema
 a second worksheet specifying the organization of the data source, e.g. table organizations include row and column information of a relational database or file format of an extracted file; and
 a third worksheet specifying how the exported data is to be represented in the destination data repository, optionally including valid data values or validation routines to be invoked to validate the exported data.

For example, the following example definition defines three single-valued fields, Provider ID, Provider Name and Country.

| Field # | Group # | Field Name | Allow Multiple | Required | Validation Rules | If Validation Fails |
|---|---|---|---|---|---|---|
| 1 | | Provider ID | N | Y | 6 characters | Do Not Import |
| 2 | | Provider Name | N | Y | Not Null | Log, Import bad data |
| 3 | | County | N | Y | Not Null | Log, Import bad data |

With an N in the Allow Multiple column, the field will only accept single values.

An extracted file data source that meets this specification may look like the following:
 14432A|Regional Neurosurgery, PC|Jefferson
 16545T|A. Reisman, MD|Lincoln Below is another example, which is an extension of the earlier example to include multiple-value fields.

| Field # | Group # | Field Name | Allow Multiple | Required | Validation Rules | If Validation Fails |
|---|---|---|---|---|---|---|
| 1 | | Provider ID | N | Y | 6 characters | Do Not Import |
| 2 | | Provider Name | N | Y | Not Null | Log, Import bad data |
| 3 | | County | N | Y | Not Null | Log, Import bad data |
| 4 | | Keyword | Y | N | | |

The Keyword field has a Y in the Allow Multiple column signifying that multiple values are accepted.

An extracted file data source that meets this specification may look like the following:
 14432A|Regional Neurosurgery, PC|Jefferson|neuro~par
 16545T|A. Reisman, MD|Lincoln|intmed~par In this case, Regional Neurosurgery will have two keywords: "neuro" and "par." Dr. Reisman will also have two keywords: "intmed" and "par."

In various embodiments, a data schema may specify multiple field sets, e.g., some fields such as address can contain multiple values and are composed of multiple fields. Below is yet another example, which is a further extension of the earlier example to include multiple field sets.

| Field # | Group # | Field Name | Allow Multiple | Required | Validation Rules | If Validation Fails |
|---|---|---|---|---|---|---|
| 1 | | Provider ID | N | Y | 6 characters | Do Not Import |
| 2 | | Provider Name | N | Y | Not Null | Log, Import bad data |
| 3 | | County | N | Y | Not Null | Log, Import bad data |
| 4 | | Keyword | Y | N | | |
| 5 | 1 | Address Line 1 | Y | N | | |

-continued

| Field # | Group # | Field Name | Allow Multiple | Required | Validation Rules | If Validation Fails |
|---|---|---|---|---|---|---|
| 6 | 1 | Address Line 2 | Y | N | | |
| 7 | 1 | City | Y | N | | |
| 8 | 1 | State | Y | N | | |
| 9 | 1 | ZIP Code | Y | N | | |

As before, a Y in the Allow Multiple column indicates that multiple values are accepted for that data item. When multiple fields have the same group number such as the Address, each field in the group may be required to contain the same number of items. If there are two "Address Line 1" entries (separated by tildes), then there must also be two "Address Line 2," "City," "State," and "ZIP Code" entries. Each entry is related between fields based on position. The second "Address Line 1" will be joined with the second "Address Line 2," the second "City," and so on to form the complete second address.

An extracted file data source that meets this specification may look like the following:
14432A|Regional Neurosurgery, PC|Jefferson|neuropar|123 W 23rd St~456 S Broadway St|~|Hillsboro~Beaverton|OR~OR|97123-97006
16545T|A. Reisman, MD|Lincoln|intmed~par|43332 NE 223rd|Suite 500|Portland|OR|97223

In this example,
Regional Neurosurgery has two addresses:
1. 123 W 23$^{rd}$ St
   Hillsboro, Oreg. 97123
2. 456 S Broadway St
   Beaverton, Oreg. 97006
Address Line 2 is blank for both addresses. Field 6 just contains "~". The left side of the tilde is the first Address Line 2, which is blank, and the right side of the tilde is the second Address Line 2, which is also blank. Since there are two addresses, there must be two Address Line 2 entries (as opposed to leaving field 6 completely blank).
Dr. Reisman only has one address, so no tildes appear.

In various embodiments, to allow for greater flexibility, the second-level and third-level delimiter characters may be used in single-valued fields. This rule also extends to the use of third-level delimiters in lists of non-list values (that is, fields in which multiples are allowed and in which the validation rule begins with "One of:").

In various embodiments, the names and formats of certain fields may be pre-determined. Further, the embodiments may require that: If destination data repository accommodates a list of values, then the data source schema must also allow a list of values. For example:
All Address fields (for both Provider Addresses and Provider Contact Addresses) are lists.
Address Types and Contact Types are lists of lists.
Tax IDs are lists.
Specialties are lists.
Keywords are lists.
Child Provider IDs (and thus Parent Provider IDs) are lists.

In various embodiments, the specification of subprovider hierarchies may be achieved in any of several ways. The destination data repository may utilize lists of child provider IDs to build subprovider hierarchies. The data schema may complementarily support specification of subprovider hierarchies either by lists of child provider IDs, or by lists of parent provider IDs. In either case, the data schema may require the field "Child Provider IDs" in order to build subprovider hierarchies. Optionally, the data schema may include an additional "Parent Provider IDs" field. If so, the data schema may specify translation of "Parent Provider IDs" into "Child Provider IDs."

In various embodiments, a "Validation Rules" and a "If validation fails . . . " column in a spreadsheet form data schema which may be employed to help determine the validation behavior of a data exporter to be generated. In various embodiments, the following syntaxes may be employed:
Types
One of: [<category>:]<name>: [{<value>, <value>, <value>, . . . }]
List of: [<category>:]<name>: [{<value>, <value>, <value>, . . . }]
<category> is one of
   "Choreo Extensible Type"
   "Adapter Predefined Type"
   "Customer Defined Type" (by default, if no <category> is present)
<name> is a single identifier, made up of letters, numbers, underscores, hyphens.
If category is "Extensible Type," then name must be one of:
   Provider
   Address
   Name
   Contact
   User
   Attachment
   Memo
If category is "Exporter Predefined Type", then name must be one of the types defined below in the "Built-in validation rules" section.
If the category is "Extensible Type," then during online validation, actual destination data repository values are used. During offline validation, if values are present in the specification, then they are used; otherwise no validation is performed.
If more than one type of definition of the same name is present, then the first one is used. Empty type definitions defer to same-named definitions with content.
Type names and values are always caseless.
Length
   <n> characters
   length: <n> characters
   length: <min>-to-<max> characters
"If validation fails . . . " Syntax
All validation failures are logged, so there is no need to specify a logging action.
Upon failure, the following strings are recognized:
   do not import
   use invalid value
   use null
   use "<default value>"
Built-In (aka Predefined) Validation Rules
The data exporter generator provides several general-purpose built-in validation rules for use by the customer. They are:
US_Zip_Code
   5 digits (ie, ddddd)
   9 digits (ie, ddddddddd)
   ddddd-dddd
Tax_ID
   9 digits (ie, ddddddddd)
   ddd-dd-dddd (SSN using hyphens)
   ddd dd dddd (SSN using spaces)
   dd-ddddddd (EIN using hyphens)
   dd ddddddd (EIN using spaces)

Date_format_MM-DD-YYYY
    MM-DD-YYYY
Yes_No
US_State_2_letter Abbreviation

In various embodiments, one exporter is employed to export and import the place of service address, and another exporter is employed to export and import the contracting address subject to different business rules. In various embodiments, different exporters are employed to export and import provider demographic data from different regions. In various embodiments, the exporters are employed to establish and maintain the provider grouping.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A system, comprising:
    at least one memory storing computer-executable instructions; and
    at least one processor configured to access the at least one memory and execute the computer-executable instructions to:
        generate, using a data exporter generator, a data exporter for exporting data stored in a data source, wherein the at least one processor is configured to generate the data exporter by executing the computer-executable instructions to:
            determine, using the data exporter generator, a data schema associated with the data source that provides a description of the data,
            configure, using the data exporter generator and based at least in part on the data schema, a read interface, wherein the read interface enables the data exporter to read the data from the data source, and
            configure, using the data exporter generator and based at least in part on the data schema, a validation block, wherein the validation block enables the data exporter to validate the data;
        export, using the data exporter, the data stored in the data source; and
        communicate the data to a data importer for importing into a destination data repository.

2. The system of claim 1, wherein the validation block enables the data exporter to validate the data in-line or by invoking one or more supplemental validation routines.

3. The system of claim 1, wherein the at least one processor is further configured to execute the computer-executable instructions to:
    configure, using the data exporter generator and based at least in part on the data schema, a transformation block and one or more associated transformation rules, wherein the transformation block enables the data exporter to transform the data in accordance with the one or more transformation rules to generate transformed data.

4. The system of claim 3, wherein the transformation block enables the data exporter to transform the data from a first format associated with the data schema to a second format associated with the destination data repository.

5. The system of claim 3, wherein the at least one processor is further configured to execute the computer-executable instructions to:
    generate, using the data exporter generator, a write interface, wherein the write interface enables the data importer to write the transformed data into the destination data repository.

6. The system of claim 1, wherein the at least one processor is further configured to execute the computer-executable instructions to:
    generate, using the data exporter generator, a plurality of additional data exporters associated with a plurality of additional data sources, wherein each additional data exporter is configured to export respective data stored in a respective one of the plurality of additional data sources, and wherein a respective additional data schema describes the respective data stored in each of the plurality of additional data sources.

7. The system of claim 1, wherein the data comprises a plurality of data fields comprising:
    i) one or more single-value fields each comprising a respective value, and
    ii) one or more variable length fields each comprising a respective plurality of values.

8. The system of claim 7, wherein one or more first-level delimiters delineate each data field of the plurality of data fields from each other data field of the plurality of data fields.

9. The system of claim 8, wherein one or more second-level delimiters delineate each value of the respective plurality of values of a respective at least one of the one or more variable length fields from each other value of the respective plurality of values.

10. The system of claim 7, wherein the data comprises a plurality of variable length fields, wherein two or more of the plurality of variable length fields form at least part of a multiple field set, and wherein an identifier associated with the multiple field set indicates a same number of values associated with each of the two or more variable length fields.

11. The system of claim 7, wherein the destination data repository accommodates the one or more single-value fields and the one or more variable length fields.

12. The system of claim 1, wherein the data source is a medical service provider demographic data source associated with one or more medical service providers.

13. The system of claim 12, wherein the data schema supports specification of medical service subprovider hierarchies.

14. A system, comprising:
    at least one processor; and
    at least one memory storing:
        a data exporter generator for generating a data exporter for exporting data stored data source;
        the data exporter; and
        a data importer,
        wherein the data exporter generator comprises computer-executable instructions that, responsive to execution by the at least one processor, cause operations to be performed for generating the data exporter, the operations comprising:
            determining a data schema associated with the data source that provides a description of the data, generating a read interface based at least in part on the data schema, wherein the read interface enables the data to be read from the data source, and generating a validation block based at least in part on the data schema, wherein the validation block enables validation of the data read from the data source, wherein the data exporter comprises computer-executable instructions that, responsive to execution by the at least one processor, cause operations to be performed comprising:

exporting the data from the data source based at leas in part on the read interface, and validating the read data based at least in part on the validation block, and wherein the data importer comprises computer-executable instructions that, responsive to execution by the at least one processor, cause the data exported by the data exporter to be imported into a destination data repository.

15. The system of claim 14, wherein the data exporter generator further comprises computer-executable instructions that, responsive to execution by the at least one processor, cause:

a transformation block and one or more associated transformation rules to be generated based at least in part on the data schema, wherein the transformation block enables transformation of the data in accordance with the one or more transformation rules to generate transformed data responsive to execution by the at least one processor of the computer-executable instructions of the data exporter.

16. The system of claim 15, wherein the data exporter generator further comprises computer-executable instructions that, responsive to execution by the at least one processor, cause:

a write interface to be generated, wherein the write interface enables the transformed data to be written into the destination data repository responsive to execution by the at least one processor of the computer-executable instructions of the data importer.

* * * * *